United States Patent [19]
Harp et al.

[11] Patent Number: 5,024,799
[45] Date of Patent: Jun. 18, 1991

[54] METHOD FOR PRODUCING AN EMBOSSED ORIENTED FILM

[75] Inventors: Raymond S. Harp; Donald L. Smith, both of Terre Haute, Ind.

[73] Assignee: Tredegar Industries, Inc., Richmond, Va.

[21] Appl. No.: 453,821

[22] Filed: Dec. 19, 1989

Related U.S. Application Data

[60] Division of Ser. No. 205,643, Jun. 13, 1988, which is a continuation-in-part of Ser. No. 95,956, Sep. 14, 1987, abandoned.

[51] Int. Cl.$^5$ .............................................. B29C 59/04
[52] U.S. Cl. ................................. 264/284; 264/289.6; 425/385
[58] Field of Search ............... 264/284, 289.6, 210.2, 264/210.4, 235, 288.4; 425/385, 363

[56] References Cited

U.S. PATENT DOCUMENTS

| | | |
|---|---|---|
| Re. 27,404 | 6/1972 | Williams, Jr. et al. ........... 264/210.4 |
| 2,534,296 | 12/1950 | Pike et al. . |
| 2,944,294 | 7/1960 | Bourbeau et al. ................ 264/284 |
| 3,176,058 | 3/1965 | Mittman ........................... 264/284 |
| 3,194,863 | 7/1965 | Williams, Jr. et al. . |
| 3,503,843 | 3/1970 | Williams, Jr. et al. . |
| 3,504,075 | 3/1970 | Williams, Jr. et al. ........... 264/175 |
| 3,632,733 | 1/1972 | Yazawa .............................. 264/235 |
| 3,842,152 | 10/1974 | Witfield, Jr. et al. ............ 264/284 |
| 3,956,450 | 5/1976 | Abe et al. ........................ 264/210.2 |
| 4,062,918 | 12/1977 | Nakanose ........................ 264/235 |
| 4,085,187 | 4/1978 | Jenks et al. . |
| 4,243,463 | 1/1981 | Gash . |
| 4,355,076 | 10/1982 | Gash . |
| 4,376,147 | 3/1983 | Byrne et al. . |
| 4,436,520 | 3/1984 | Lipko et al. . |
| 4,652,490 | 3/1987 | Arita et al. . |
| 4,666,772 | 5/1987 | Schinkel et al. . |
| 4,680,207 | 7/1987 | Murray ............................. 428/500 |

FOREIGN PATENT DOCUMENTS

| | | |
|---|---|---|
| 1021916 | 12/1977 | Canada . |
| 1039911 | 10/1978 | Canada . |
| 2635585 | 2/1978 | Fed. Rep. of Germany ...... 264/284 |
| 62-11645 | 1/1987 | Japan ................................ 425/385 |
| 1526722 | 9/1978 | United Kingdom . |
| 1526723 | 9/1978 | United Kingdom . |
| 1526724 | 9/1978 | United Kingdom . |
| 1577128 | 10/1980 | United Kingdom . |

Primary Examiner—Jeffery Thurlow
Attorney, Agent, or Firm—Emch, Schaffer, Schaub & Porcello Co.

[57] ABSTRACT

Oriented or strength-enhanced embossed film is produced by introducing a thermoplastic film having an inert liquid lubricant covering its surfaces into the nip between at least one pair of rotating compression rolls under sufficient pressure to reduce the thickness of the film, and simultaneously embossing at least one of the film surfaces within the nip. While various inert liquids may be used as the lubricant, use of water for this purpose is preferred. The lubricant is believed to provide a hydrodynamic wedge at the film-compression roll interfaces, and for best results it is preferred to spray the lubricant (most preferably, water) into both incoming sides of the nip of the compression rolls.

27 Claims, 2 Drawing Sheets

METHOD FOR PRODUCING AN EMBOSSED ORIENTED FILM

REFERENCE TO RELATED APPLICATION

This application is a division of a prior copending application Ser. No. 07/205,643, filed June 13, 1988 which was a continuation-in-part of prior copending application Ser. No. 95,956, filed Sept. 14, 1987, now abandoned.

BACKGROUND OF THE INVENTION

This invention provides a process in which orientable thermoplastic film is converted simultaneously into an embossed oriented film. Moreover, by use of certain thermoplastic films in the process, novel thin embossed films having desirable strength properties are produced. Such films are useful in the manufacture of backsheets for diapers, surgical dressings, sanitary napkins, etc., and for various packaging applications.

In accordance with this invention there is provided a method of producing oriented or strength-enhanced embossed film which comprises (i) introducing into the nip between at least one pair of rotating compression rolls one or more thermoplastic films having an inert liquid lubricant covering the film surfaces proximate to at least one pair of said compression rolls, the pressure between at least said one pair of compression rolls being sufficient to reduce the thickness of the film(s) passing through the nip thereof; and (ii) simultaneously embossing at least one film surface within said nip.

Two or more films may be superimposed on each other and passed through the compression rolls in order to effect the reduction in film thickness, film orientation or strength enhancement, and film embossing. When applying the process to two or more superposed films, the two outer sides of the film bundle are thoroughly wetted with the lubricant, preferably by spraying the lubricant (e.g., water) thereon as the superposed films are proceeding into the compression nip. Thus the outer side of the outermost films directly confronting the rolls are wet as they are proceeding into the nip.

SUMMARY OF THE INVENTION

In most cases the process of this invention will be applied to a single ply of thermoplastic film, such as a polyolefin film or any other orientable, or strength-enhanceable, embossable thermoplastic film. In conducting such a process, the single ply of film is preferably sprayed on both sides with the liquid lubricant, most preferably water containing a small amount (e.g., 1 to 3 percent by weight) of a surfactant or wetting agent such as sodium dioctylsulfosuccinate, so that both sides of the film are thoroughly wetted by the water, and most preferably, the so-wetted film is introduced into the nip of a single pair of compression rolls in which the reduction in thickness, orientation or strength enhancement and embossing occur. Most preferably the surface of one or both of the compression rolls is textured or has a matte finish.

The process of this invention in another of its embodiments comprises a method of producing oriented or strength-enhanced embossed film which comprises introducing a thermoplastic film having an inert liquid lubricant covering its surfaces into the nip between at least one pair of compression rolls rotating at an output speed two to ten times the incoming film speed and under sufficient pressure to reduce the thickness of the film, and simultaneously embossing at least one of said surfaces within said nip. While various inert liquids may be used as the lubricant, as noted above, use of water for this purpose is preferred. Without desiring to be bound by theoretical considerations, it is believed that the lubricant provides a hydrodynamic wedge at the film-compression roll interfaces, and thus for best results it is preferred to spray the lubricant (most preferably, water) into both incoming sides of the nip of the compression rolls, or at least onto the film as it is approaching the nip so that a continual bead of lubricant exists on or near the incoming side of the nip.

By "hydrodynamic wedge" is meant that an amount of liquid on the incoming side of the nip is sufficient to at least reduce the amount of metal-to-film contact occurring in the zone immediately in front of the neutral point of the nip as compared to the amount of metal-to-film contact that would occur in the absence of the liquid.

Depending on the composition of the substrate films used in the process, it is possible to produce embossed films of widely different nominal thickness (i.e., thickness or gauge of the film itself apart from the increased apparent thickness imparted by the embossing). For example, films as thin as 0.3 mil or less up to 10 mils or more may be produced. Thus, the invention is not limited to any specific thickness range—rather this process may be applied to the production of films of any thickness so long as the resultant film is embossed, is self-supporting, and is oriented or has an increased machine direction tensile strength as compared to an untreated film of the same thickness made from the same polymer but not subjected to the process of this invention. The degree of orientation generally ranges, but is not limited to, a compression ratio of 1.1:1.0 up to 20:1 and preferably 1.1:1.0 up to 10:1.0. The textured or matte surface may be applied to one or both sides of the film surface.

The process is applicable to a wide variety of orientable as well as non-orientable thermoplastic films including but not limited to polyolefin, polystyrene, nylon, polyester and polycarbonate films. These may be formed by slot casting or by blown film extrusion procedures. Preferred polyolefin films for use in the process of this invention include polyethylene films, polypropylene films, and films made from blends of polyethylene and polypropylene. Orientable polyethylenes such as linear low density polyethylene (LLDPE), linear medium density polyethylene (LMDPE), high density polyethylene (HDPE), and ultra low density linear polyethylene (ULDLPE), and blends of any two or more of such orientable polyethylenes are particularly preferred. Nevertheless when films composed entirely of low density polyethylene (LDPE, a material which is not generally regarded as an orientable polymer) are subjected to the process, the resultant embossed film exhibits a small but significant increase in machine direction tensile strength (an increase of up to about 15%) as compared to an untreated LDPE film of the same thickness or gauge. Consequently, films composed entirely of LDPE or blends of LDPE with one or more orientable polyethylenes may be subjected to the process of this invention. When using low density polyethylenes superior anti-block properties may be achieved by blending up to about 20 weight percent of HDPE with the low density polyethylene (e.g., LLDPE, LMDPE, and ULDLPE). Blends of LDPE, LLDPE or LMDPE (or any mixture of any two or all three of these substances) together with 3 to 30 weight percent of polypropylene also provide films having desirable properties for use in the practice of this invention. Likewise, films composed entirely of polypropylene may be used in the practice of this invention. For a comprehensive discussion of polyethylenes and polypropylenes reference may be had to *Kirk-Othmer Encyclopedia of Chemical Technology,* Third Edition, John Wiley & Sons, Copyright 1981, Volume 16, pages 385 to 469 and references cited therein.

A feature of this invention is that the embossing may be effected in a variety of ways. For example, the embossing may be effected by one or both of the pair of opposed compression rolls. When both have embossed surfaces an orientable film (which may be a monolayer film, a coextruded film, or a laminated film) being processed thereby will be oriented (chiefly in the machine direction) and embossed on both sides. Oriented films embossed on one side are formed when subjecting an orientable monolayer, coextruded or laminated film to the action of one embossed compression roll and one unembossed compression roll. In this latter case it is preferred that the unembossed roll have a mirror finish as this produces a special type of oriented film having an embossed surface on one side and a smooth, glossy surface on the other side.

In another embodiment of this invention embossing is effected in the nip between superposed films, one of which is preembossed with the embossing confronting an unembossed surface of another film. More particularly this method comprises introducing two or more superposed orientable thermoplastic films one of which has an embossed surface abutting an unembossed surface of another said film into the nip between at least one pair of compression rolls rotating at an output speed of two to ten times the incoming film speed and under sufficient pressure to reduce the combined thickness of the films, and maintaining a hydrodynamic wedge at the film-compression roll interfaces, whereby said films are oriented and simultaneously said unembossed surface is embossed. Many variations using this procedure are possible. If smooth compression rolls are used with two films, one being preembossed with an embossed surface abutting the other film, the result is the formation of two oriented films one of which is embossed in the nip by the other. Embossing may be simultaneously added to the reverse side of either or both such films by using one or two embossed compression rolls in the process. Likewise with smooth compression rolls one film preembossed on both sides can be used to emboss one side of two other films by feeding all three films into the nip with the preembossed film being in between the other two films. The result is three oriented films, two of which are embossed in the nip by the preembossed film. Here again embossing may be simultaneously added to the reverse side of either or both of the outer films by using one or two embossed compression rolls in the process.

When suitable substrate polymer films are used in the process—e.g., polyolefin films made from one or any mixture of polyolefins—thin embossed films having a very desirable combination of properties can be produced. In general these films have a matte or textured surface on at least one side thereof, a nominal thickness of 10 mils or less (preferably not substantially in excess of about 2 mils and most preferably below about 1.5 mils), a machine direction tensile strength of at least 5000 psi, a transverse direction tensile strength of at least 2000 psi, a machine direction elongation of at least 10% and a transverse direction elongation of at least 100%. Films of this type may be produced for example from LDPE. Preferred articles provided by this invention are oriented, embossed films having a machine direction tensile strength of at least 10000 psi, a transverse direction tensile strength of at least 2000 psi, a machine direction elongation of at least 10% and a transverse direction elongation of at least 100%. Particularly preferred articles provided by this invention are oriented, embossed films having a nominal thickness of 10 mils or less (preferably not substantially in excess of 2 mils), a machine direction tensile strength of at least 13000 psi (most preferably at least 20000 psi), a transverse direction tensile strength of at least 4000psi (most preferably at least 5500 psi), a machine direction elongation of at least 40% (most preferably at least 300%) and a transverse direction elongation of at least 700%. Films of this type may be produced for example from a linear low density polyethylene or a linear medium density polyethylene film composed of a copolymer of ethylene and up to about 10% by weight of 1-hexene or 1-octene, said copolymer having a density of 0.940 g/cm$^3$ or below.

In accordance with an especially prefered embodiment of this invention, there is provided an oriented thermoplastic film (most preferably a polyethylene, polypropylene or nylon film) having a matte surface on one side thereof and a smooth, glossy surface on the other side thereof, and having a nominal thickness of two mils or less, said film having a machine direction tensile strength of at least 20000 psi and a transverse direction tensile strength of at least 4000 psi, said matte surface being in the range of 10 to 300 Ra (preferably 10 to 150 Ra, most preferably about 50 Ra) surface roughness, and said smooth, glossy surface being essentially free of surface flaws as observed at 700 magnification using a scanning electron microscope.

As noted above, the films used in the process may be monolayer films composed throughout of the same thermoplastic polymeric material (e.g., a single polymer or a substantially homogeneous blend of two or more polymers). Alternatively the films used may be coextruded films or laminated films. As is well known in the art, coextruded films may be composed of two or more layers depending upon the number of extrusion dies used in its manufacture. Likewise, laminated films may be composed of two or more plies of preformed polymer films. The makeup of adjacent layers in the coextruded films and in the laminated films will usually differ from each other although it is possible to coextrude or laminate films in which the adjacent layers are composed of the same polymer.

DETAILED DESCRIPTION OF THE PREFERRED EMBODIMENT

Figure 1:
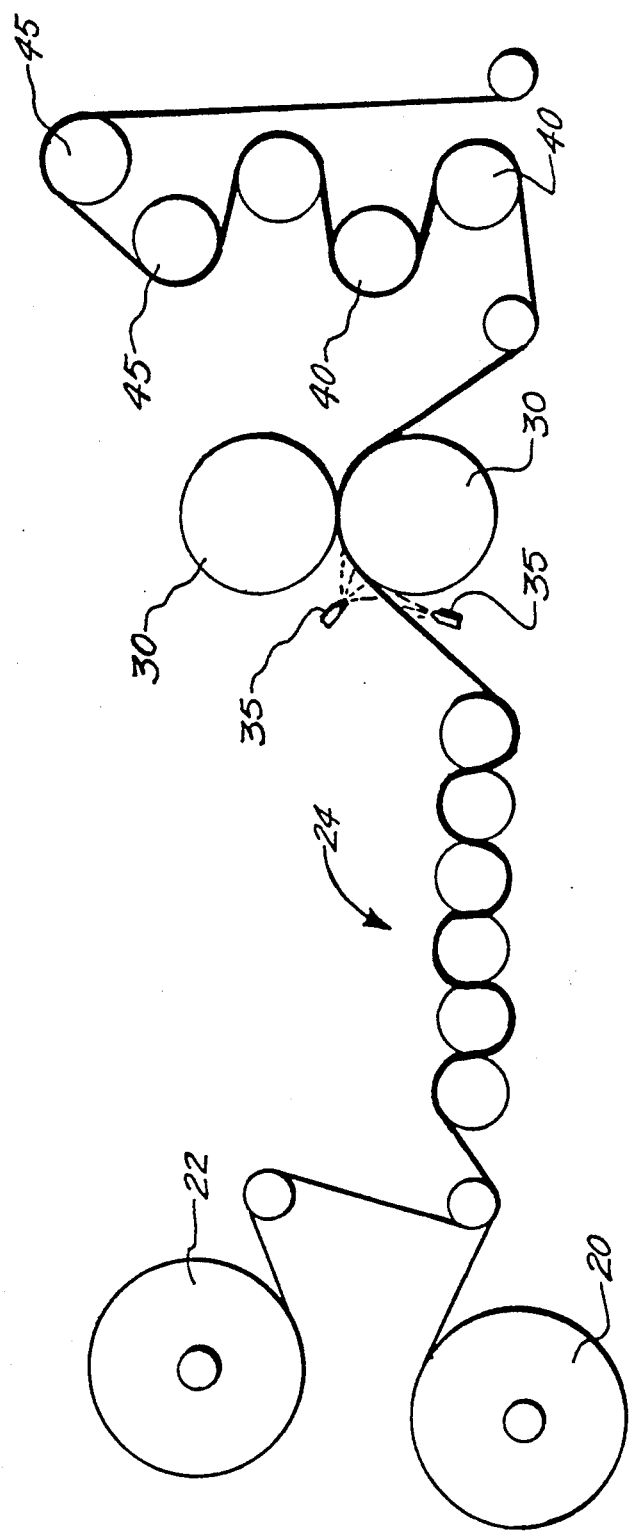
FIG. 1 of the Drawing depicts schematically in side elevation typical apparatus that may be used in conducting the process of this invention.

Referring to FIG. 1, film to be processed is taken from supply roll 20 (and from supply roll 22 if two films are being processed simultaneously), serpentined through a bank of dynamic braking rolls 24 and passed into the nip between compression rolls 30,30 where the embossing and machine direction orientation are simultaneously effected as previously explained. The simultaneous orientation and embossing may be conducted at room temperatures or at elevated temperatures below the melting point of the polymer being used, typically less than 200° F. for polyolefins. In the case of nylon, polyester, and polycarbonate, temperatures above 200° F. may be used. However in most other cases so called cold embossing conditions (e.g., temperatures in the range of room temperature up to about 150° F.) are preferred. Thus suitable heating means (not shown) may be included in the system to heat the film approaching rolls 30,30 and rolls 30,30 may themselves be heated to a suitable temperature. In the system depicted, lubricating spray is applied by means of spray nozzles 35,35 to the outer surface(s) of the film(s) entering the nip between rolls 30,30 to develop a hydrodynamic wedge therein between the outer film surfaces and the opposed roll surfaces. Film leaving the nip is then serpentined through an annealing station composed of a suitable number of heated rolls 40,40 and a suitable number of cooling rolls 45,45 positioned downstream from the heated rolls. The annealed oriented embossed film is then passed to a slitter and/or winder (not shown). It will be understood that they dual unwind depicted in the Drawing may be replaced with an in-line extruder and die. In such a case, mill rolls are not required.

It will be understood of course that depending on how the embossing is effected within the nip, either or both of rolls 30,30 may have smooth surfaces or embossed surfaces and that when smooth, the surface is preferably a mirror finish. These rolls are operated at a speed greater than the speed of the incoming film(s) and are under compression ranging from 500 to 3500 pli depending on the thickness and type of film being processed and the extent of the orientation or strength-enhancement desired therein.

It will also be understood that when passing a film (preembossed on both sides) along with two other films to be embossed thereby in the nip of rolls 30,30, another supply roll (not shown) will be provided along with supply rolls 20 and 22. If desired two or more pairs of compression rolls 30,30 may be used in series so that the simultaneously conducted embossing and orientation is conducted in stages, preferably with at least the orientation being increased from stage to stage.

Figure 2:
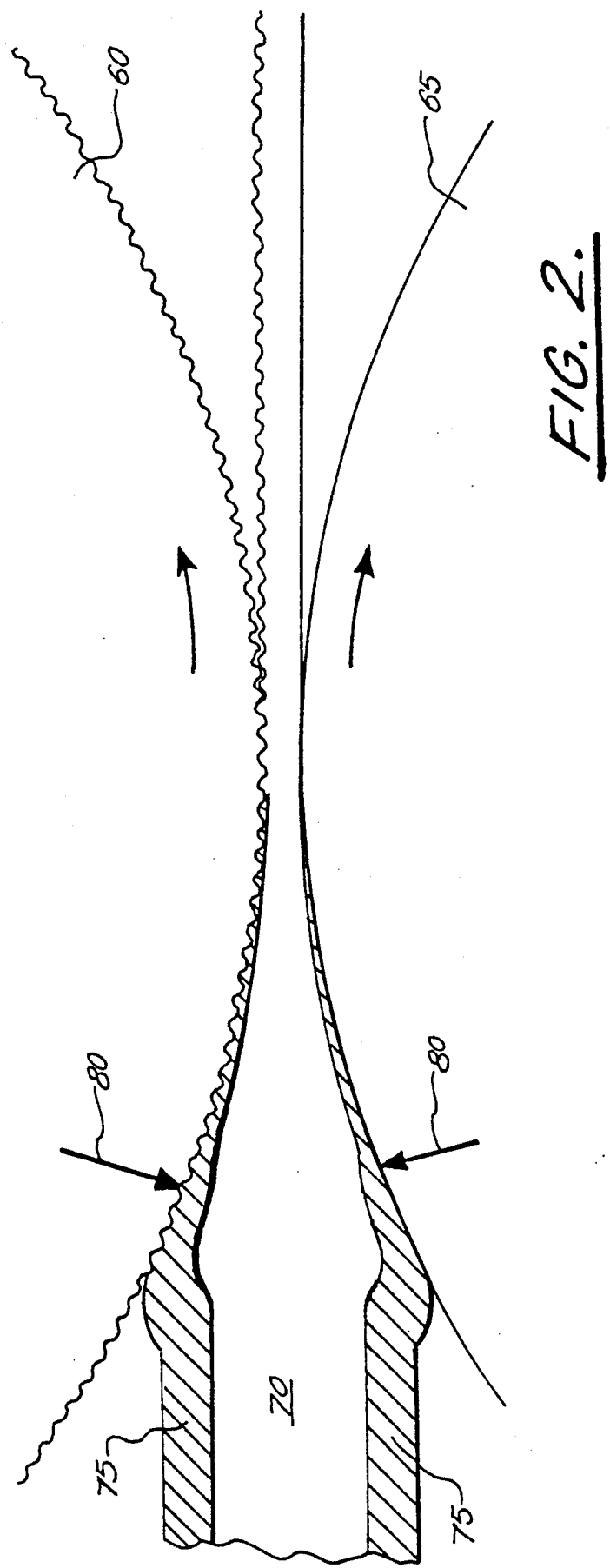
FIG. 2 depicts schematically the manner by which the hydrodynamic wedge is believed to function in the process.

FIG. 2 presents an enlarged, somewhat idealized view of what is believed to occur in the compression-/embossing nip of a pair of compression rolls when a thoroughly wetted single ply of film is passed therethrough. In the system depicted, one compression roll 60 may be, for example, a steel roll with an outer diameter of 14 inches and a 50 Ra matte finish, Ra being the arithmetic roughness of the surface measured in microinches. The other roll 65 may be, for example, a steel roll with an outer diameter of 14 inches and a mirror finish. A single ply of plastic film 70 is thoroughly wetted on both sides by a liquid lubricant 75,75 preferably water containing a surfactant, applied by sprays or other suitable means (not shown), and is caused to pass through the nip between rolls 60 and 65. Film 70, which may have an initial thickness or gauge of, for example, 6 mils is reduced in thickness by compression in the nip so that the film leaving the nip may be, for example, 1 mil thick. The side of the film confronting (proximate to) roll 65 has a smooth finish whereas the side of the film confronting roll 60 is embossed by roll 60 and thus has a matte finish, such as for example a 50 Ra matte finish. As film 70 coated with lubricant 75 approaches the nip, the lubricant is believed to become wedged between the roll surfaces and the film itself so that the compressive forces being applied to the film 70 (e.g., as at arrows 80, 80) as the film passes toward the neutral point of the nip are applied from the rolls to the lubricant and thence to the film. Thus the amount of direct contact between the roll surfaces and the film is believed to be reduced by the lubricant, as compared to the amount of such direct contact that would occur if lubricant were not used. Thus it is believed that a hydrodynamic wedge is formed in the process and that this contributes to the efficacy of the operation. However, as noted above, it is not intended that this invention be limited by such theoretical or mechanistic considerations. The point is that the process works, and works well, irrespective of the exact way by which it actually functions.

The following examples are illustrative.

EXAMPLE I

Using apparatus of the type generally as described above with reference to FIG. 1, a preembossed film (10 mils HDPE embossed on one side only) was run through the compression nip with the embossed side in contact with an unembossed blown LDPE film made from a 2.4 melt index LDPE resin. Both compression rolls were smooth. The films were oriented to a ratio of 3:1 in the machine direction in the nip and simultaneously the LDPE film was embossed in the nip. The roll temperature in the operation was 145° F. and the output speed was approximately 50 feet per minute. The resulting embossed and oriented LDPE film had a gauge (TBW) of 1.17 mils and exhibited the following properties:

| Tensile | MD | 6950 |
| --- | --- | --- |
| (PSI) | TD | 2270 |
| Elongation | MD | 167 |
| (%) | TD | 696 |
| 1% Modulus | MD | 27700 |
| (PSI) | TD | 33000 |
| 25% Stress | MD | 1970 |
| (Gms) | TD | 675 |
| 10% Stress | MD | 1000 |
| (Gms) | TD | 835 |
| 45° Gloss | B | 50 |
| (%) | F | 30 |

EXAMPLE II

The procedure of Example I was repeated in the same fashion except that the unembossed film fed to the nip was a blown LLDPE film (made from a 1.0 melt index LLDPE resin). The resultant embossed oriented LLDPE film had a gauge (TBW) of 1.50 mils and exhibited the following properties:

| Tensile | MD | 13700 |
| --- | --- | --- |
| (PSI) | TD | 5800 |
| Elongation | MD | 310 |
| (%) | TD | 750 |
| 1% Modulus | MD | 23100 |
| (PSI) | TD | 43700 |
| 25% Stress | MD | 2010 |
| (Gms) | TD | 1100 |
| 10% Stress | MD | 1170 |
| (Gms) | TD | 1270 |
| 45° Gloss | B | 38 |

-continued

| (%) | F | 17 |
|---|---|---|

EXAMPLE III

Various single ply plastic films were subjected to compression-embossing using a pair of compression rolls 26 inches in length and 14 inches in diameter. The upper roll had a chromed surface that had been sandblasted to a nominal 50 Ra surface roughness. A smooth finished roll was in the bottom position. In each case the top and bottom surfaces of the film entering the nip were sprayed with water containing 2% by weight of sodium sulfosuccinate surfactant from banks of spray nozzles. In each case the resultant film had one smooth and one matte surface (a nominal surface roughness of approximately 50 Ra).

The films subjected to these operations were:

Run No. 1—White ultra low density linear polyethylene (ULDLPE)

Run No. 2—White linear low density polyethylene (LLDPE)

Run No. 3—White low density polyethylene (LDPE)

Run No. 4—Clear linear low density polyethylene (LLDPE)

Run No. 5—Clear low density polyethylene (LDPE)

The ULDLPE used was identified by the manufacturer (Dow Chemical) as "ULDPE". A ULDLPE having similar properties is understood to be available from Union Carbide who refer to their product as "VLDPE".

The conditions used and the properties of the resultant films are summarized in Tables I and II, respectively.

TABLE I

| | | | | | Processing Conditions | | | | |
|---|---|---|---|---|---|---|---|---|---|
| | Input (fpm) | Comp. Roll (fpm) | Matte Roll Temp. °F. | Smooth Roll Temp. °F. | Anneal Oven Temp. °F. | Comp. Roll Press. PLI | Input Tension (Lbs.) | Output Tension (Lbs.) | Comp. Ratio |
| 1 | 13 | 70 | 230 | 220 | 160 | 1500 | 13 | 13 | 5.5 |
| 2 | 17 | 100 | 260 | 250 | 160 | 2700 | 27 | 16 | 6.0 |
| 3 | 30 | 100 | 240 | 130 | off | 2300 | 15 | 15 | 3.0 |
| 4 | 63 | 232 | 180 | 240 | off | 2300 | 30 | 20 | 3.7 |
| 5 | 29 | 100 | 240 | 210 | 160 | 2700 | 27 | 16 | 3.4 |

TABLE II

| | | | | | | Resultant Film Properties | | | | | |
|---|---|---|---|---|---|---|---|---|---|---|---|
| | | Comp. Ratio | TBW (mils) | Tensile (psi) | Elong. (%) | 1% Sec Mod (psi × 10) | Elm. Tear (gms/mil) | Haze (%) | Matte Gloss (%) | Puncture (Lbs.) | Heat Seal (Lbs.) |
| 1 | MD | 5.5 | 1.00 | 24,000 | 135 | 37 | 470 | — | 8 | 23 | 2.2 |
| | TD | — | — | 4,300 | 780 | 41 | N.T. | — | — | — | 4.5 |
| 2 | MD | 6.0 | 1.00 | 32,000 | 40 | 100 | 320 | — | 13 | 65 | 2.0 |
| | TD | — | — | 4,200 | 825 | 99 | N.T. | — | — | — | 2.5 |
| 3 | MD | 3.0 | 1.50 | 17,000 | 30 | 81 | 180 | — | 10 | 12 | 2.0 |
| | TD | — | — | 2,300 | 520 | 95 | 290 | — | — | — | 4.4 |
| 4 | MD | 3.7 | 1.00 | 21,000 | 160 | 38 | 200 | 60 | 16 | 21 | 2.0 |
| | TD | — | — | 4,500 | 800 | 51 | N.T. | — | — | — | 4.9 |
| 5 | MD | 3.4 | 1.00 | 11,000 | 50 | 50 | 400 | 69 | 13 | 5 | 1.5 |
| | TD | — | — | 2,100 | 500 | 63 | 200 | — | — | — | 4.0 |

N.T. = No Tear

This invention is susceptible to considerable variation in its practice within the spirit and scope of the ensuing claims.

What is claimed is:

1. A method of producing oriented or strength-enhanced embossed film which comprises: introducing into the nip between at least one pair of rotating compression rolls one or more orientable thermoplastic films having an inert liquid lubricant covering the film surfaces proximate to at least one pair of said compression rolls, the pressure between at least said one pair of compression rolls being sufficient to reduce the thickness of the film(s) and orient the film(s) passing through the nip thereof; and embossing at least one film surface within said nip as the film(s) is oriented.

2. The method of claim 1 wherein the thermoplastic film being introduced into said nip is polyolefin film.

3. The method of claim 1 wherein the thermoplastic film being introduced into said nip is a single ply of polyolefin film, both surfaces of which have inert liquid lubricant applied thereto so that said surfaces are thoroughly wetted with said lubricant as said film enters into said nip.

4. The method of claim 1 wherein the thermoplastic film being introduced into said nip is orientable thermoplastic film.

5. The method of claim 1 wherein the thermoplastic film being introduced into said nip is a single ply of orientable thermoplastic film, both surfaces of which have inert liquid lubricant applied thereto so that said surfaces are thoroughly wetted with said lubricant as said film enters into said nip.

6. The method of claim 1 wherein the thermoplastic film being introduced into said nip is orientable thermoplastic polyethylene film.

7. The method of claim 1 wherein the thermoplastic film being introduced into said nip is a single ply of orientable thermoplastic polyethylene film, both surfaces of which have inert liquid lubricant applied thereto so that said surfaces are thoroughly wetted with said lubricant as said film enters into said nip.

8. The method of claim 1 wherein one of said pair of compression rolls has an embossed surface and the other of said pair of compression rolls has a mirror finish.

9. The method of claim 1 wherein both of said pair of compression rolls have embossed surfaces.

10. The method of claim 1 wherein said inert liquid lubricant is water sprayed onto both incoming sides of said film as it is entering said nip to create a hydrodynamic wedge at the film-compression roll interfaces.

11. The method of claim 1 wherein a single ply of thermoplastic film is sprayed on both sides with water containing a small amount of a surfactant so that both sides of the film are thoroughly wetted by the water, and wherein the so-wetted film is introduced into the nip of a single pair of compression rolls in which the reduction in film thickness and simultaneous embossing occur.

12. The method of claim 11 wherein one of said compression rolls has a matte or textured surface.

13. The method of claim 11 wherein both of said compression rolls have a matte or textured surface.

14. A method for producing oriented or strength-enhanced embossed film which comprises introducing an orientable thermoplastic film having an inert liquid lubricant covering its surfaces into the nip between at least one pair of compression rolls rotating at an input speed two to ten times the incoming film speed and under sufficient pressure to reduce the thickness of the film and orient the film; and embossing at least one of said surfaces of the film within said nip as the film is oriented.

15. The method of claim 14 wherein the thermoplastic film being introduced into said nip is a polyolefin film.

16. The method of claim 14 wherein the thermoplastic film being introduced into said nip is an orientable thermoplastic film.

17. The method of claim 14 wherein the thermoplastic film being introduced into said nip is an orientable thermoplastic polyethylene film.

18. The method of claim 14 wherein one of said pair of compression rolls has an embossed surface and the other of said pair of compression rolls has a mirror finish.

19. The method of claim 14 wherein both of said pair of compression rolls have embossed surfaces.

20. The method of claim 14 wherein said inert liquid is water sprayed into both incoming sides of said nip to create a hydrodynamic wedge at the film-compression roll interfaces.

21. A method of producing oriented embossed film which comprises introducing at least two superposed orientable thermoplastic films, one of which has an embossed surface abutting an unembossed surface of another said film, into the nip between at least one pair of compression rolls rotating at an output speed of two to ten times the incoming film speed and under sufficient pressure to reduce the combined thickness of the films, and maintaining a hydrodynamic wedge at the film-compression roll interfaces, whereby said films are oriented and simultaneously said unembossed surface is embossed.

22. The method of claim 21 wherein both of said pair of compression rolls have a mirror finish.

23. The method of claim 21 wherein one of said pair of compression rolls has an embossed surface and the other of said pair of compression rolls has a mirror finish.

24. The method of claim 21 wherein both of said pair of compression rolls have embossed surfaces.

25. The method of claim 21 wherein the orientable thermoplastic film being embossed in said nip is an orientable polyolefin film.

26. The method of claim 21 wherein the orientable thermoplastic film being embossed in said nip is an orientable polyethylene film.

27. The method of claim 21 wherein the orientable thermoplastic film being embossed in said nip consists essentially of orientable polyethylene having a density of 0.940 g/cm$^3$ or below.

* * * * *